United States Patent
Kaiser et al.

(10) Patent No.: US 12,513,790 B2
(45) Date of Patent: Dec. 30, 2025

(54) DETECTING A STANDSTILL OF A ROTATABLE MICROWAVE DISTRIBUTION DEVICE

(71) Applicant: BSH Hausgeräte GmbH, Munich (DE)

(72) Inventors: Andreas Kaiser, Halfing (DE); Markus Kuchler, Gstadt am Chiemsee (DE); Markus de Vries, Tittmoning (DE); Peter Guggenberger, Bad Endorf (DE)

(73) Assignee: BSH Hausgeräte GmbH, Munich (DE)

( * ) Notice: Subject to any disclaimer, the term of this patent is extended or adjusted under 35 U.S.C. 154(b) by 950 days.

(21) Appl. No.: 17/640,361

(22) PCT Filed: Sep. 23, 2020

(86) PCT No.: PCT/EP2020/076722
§ 371 (c)(1),
(2) Date: Mar. 4, 2022

(87) PCT Pub. No.: WO2021/069227
PCT Pub. Date: Apr. 15, 2021

(65) Prior Publication Data
US 2022/0338315 A1  Oct. 20, 2022

(30) Foreign Application Priority Data
Oct. 11, 2019  (DE) .......................... 102019215684.3

(51) Int. Cl.
*H05B 6/64* (2006.01)
*H05B 6/68* (2006.01)
(Continued)

(52) U.S. Cl.
CPC ........... *H05B 6/6432* (2013.01); *H05B 6/686* (2013.01); *H05B 6/725* (2013.01); *H05B 6/745* (2013.01)

(58) Field of Classification Search
CPC .... H05B 6/6432; H05B 6/6467; H05B 6/686; H05B 6/72; H05B 6/725; H05B 6/74; H05B 6/745
See application file for complete search history.

(56) References Cited

U.S. PATENT DOCUMENTS

2010/0059509 A1  3/2010  Imai
2016/0323939 A1  11/2016  Mattfolk
2021/0400778 A1  12/2021  Meo

FOREIGN PATENT DOCUMENTS

CN   107071951 A   8/2017
DE   102013214848 A1   2/2015
(Continued)

OTHER PUBLICATIONS

National Search Report DE 102019215684.3 dated Aug. 25, 2020.
(Continued)

*Primary Examiner* — Hung D Nguyen
(74) *Attorney, Agent, or Firm* — Michael E. Tschupp; Andre Pallapies; Brandon G. Braun

(57) ABSTRACT

In a method for detecting a standstill of a rotatable microwave distribution apparatus of a household microwave appliance, while microwaves are being supplied into a cooking compartment of the household microwave appliance, a microwave leakage radiation for angle-dependent recurring fluctuations is monitored and an action in the absence of such fluctuations being detected.

18 Claims, 3 Drawing Sheets

(51) Int. Cl.
*H05B 6/72* (2006.01)
*H05B 6/74* (2006.01)

(56) References Cited

FOREIGN PATENT DOCUMENTS

| | | | |
|---|---|---|---|
| DE | 102014200355 A1 | | 7/2015 |
| DE | 102014105256 A1 | | 10/2015 |
| EP | 0467224 A2 | | 1/1992 |
| EP | 2148553 A1 | | 1/2010 |
| JP | 06203951 A | * | 7/1994 |
| JP | H06203951 A | | 7/1994 |
| JP | 2001185343 A | | 7/2001 |
| JP | 2003234174 A | | 8/2003 |
| JP | 2004259646 A | | 9/2004 |
| JP | 2010175178 A | | 8/2010 |

OTHER PUBLICATIONS

International Search Report PCT/EP2020/076722 dated Nov. 27, 2020.
National Search Report CN 202080070718.1 dated Jul. 30, 2025.

* cited by examiner

DETECTING A STANDSTILL OF A ROTATABLE MICROWAVE DISTRIBUTION DEVICE

CROSS-REFERENCES TO RELATED APPLICATIONS

This application is the U.S. National Stage of International Application No. PCT/EP2020/076722, filed Sep. 24, 2020, which designated the United States and has been published as International Publication No. WO 2021/069227 A1 and which claims the priority of German Patent Application, Serial No. 10 2019 215 684.3, filed Oct. 11, 2019, pursuant to 35 U.S.C. 119(a)-(d).

The contents of International Application No. PCT/EP2020/076722 and German Patent Application, Serial No. 10 2019 215 684.3 are incorporated herein by reference in their entireties as if fully set forth herein.

BACKGROUND OF THE INVENTION

The invention relates to a method for detecting that a rotatable microwave distribution apparatus of a household microwave appliance is at a standstill and in said method while microwaves are being supplied into a cooking compartment of the household microwave appliance, at least one microwave leakage radiation is measured. The invention also relates to a household microwave appliance having a cooking compartment, a microwave generator for generating microwaves, at least one rotatable microwave distribution apparatus for varying a field distribution of microwaves that are supplied into the cooking compartment, at least one leakage radiation measuring apparatus for measuring microwave leakage radiation and a data processing apparatus that is configured so as to implement the method. In particular, the invention can be advantageously applied to microwave cooking appliances, in particular baking ovens having a microwave function.

DE 10 2014 105256 A1 discloses a method for operating a household appliance and also a household appliance having at least one heating facility for the dielectric heating of food that is to be treated by electromagnetic radiation in at least one treatment compartment. In this case, at least one measuring system having at least one processing facility is provided. The measuring system is suitable and provided for the purpose of generating electromagnetic measuring radiation. The measuring system has at least one transmitting facility for the at least periodic transmission of electromagnetic measuring radiation into the treatment compartment and at least one receiving facility for the at least periodic reception of the measuring radiation that is transmitted into the treatment compartment. The measuring system is suitable for and provided for the purpose of detecting at least one characteristic variable for a wave characteristic of the measuring radiation that is received. The processing facility is suitable for and provided for the purpose of determining, with the aid of the change in the wave characteristic of the measuring radiation that is received in relation to the measuring radiation that is transmitted, at least one measure for a spatial power distribution of the radiation that can be supplied into the treatment compartment by the heating facility.

JP 2004259646 A discloses an apparatus having a heating chamber, a high frequency oscillator for generating high frequency waves, a waveguide for guiding the high frequency wave that is generated by the high frequency oscillator to the heating chamber. The apparatus also contains two rotary antennas for radiating the high frequency waves into the heating chamber and a control facility for controlling the respective rotational speeds of the two rotary antennas.

EP 2 148 553 A1 discloses a method for detecting a microwave leakage emission by means of a microwave sensor apparatus. A temporal curve of the detected microwave emission is stored for a time interval by a storage facility that is connected to the microwave sensor facility. A part of the stored microwave emission is evaluated. An apparatus is used so as to monitor microwave leakage in a cooking appliance. A cooking appliance is fitted with a facility for evaluating the microwave leakage.

JP 2007335377 A discloses a microwave heating apparatus that includes: a microwave generating facility; a waveguide for transmitting the microwaves from the microwave generating facility; a heating chamber for receiving an object that is to be heated by the microwave; a plurality of rotating antennas for radiating the microwave from the wave guide into the heating chamber; a drive facility for driving and rotating the rotating antennas; a temperature distribution detection facility for detecting the temperature distribution in the interior of the heating chamber; and a control facility for controlling an angular position of the rotating antennas by controlling the drive facility in coordination with a detection result of the temperature distribution detecting facility.

EP 0 467 224 A1 discloses a high frequency heating apparatus and a detector for electromagnetic waves for use in the high frequency heating apparatus that are arranged so that said high frequency heating apparatus and detector estimate the state of an article of food that is located in the heating chamber by detecting microwaves in the heating chamber.

A use of a rotatable antenna for introducing microwaves in a food treatment chamber or "cooking compartment" of the household microwave appliance is advantageous since when the antenna rotates, a mode image of the microwaves varies in the cooking compartment whereby a distribution of local regions of particularly high microwave power (so-called "hot spots") is varied whereby in turn it is possible to achieve a particularly uniform heating of food that is provided in the cooking compartment for heating. It is however possible that the rotation of the rotatable antenna is unintentionally suspended, for example in the event of a failure of an antenna motor that is driving the antenna. The fact that this rotatable antenna has unintentionally come to a standstill is not easily apparent for a user since the antenna motor operates almost silently during regular operation. Since in that case the full microwave power that is provided is still output into the cooking compartment via the rotary antenna, and moreover not all foods react sensitively to the fact that the rotatable antenna has come to a standstill and not all foods make this immediately apparent (in particular liquids in this case do not show any disadvantages), it is not necessarily immediately apparent to the user that the rotary antenna has come to a standstill. It is subsequently possible for a habituation effect to occur in relation to the impaired heating or for the impairment of the heating to be blamed on an aging of the appliance.

One possibility is to monitor, by means of a sensor such as a reed contact, a rotation of the rotary antenna or that said rotary antenna is at a standstill. In this case, it is however disadvantageous that such a monitoring is unreliable over the serviceable life of the household microwave appliance since owing to a thermal expansion the entire antenna structure noticeably moves during a microwave operation (for example raises and lowers with a cover of the cooking compartment) or can only be implemented with a particularly high constructive outlay.

BRIEF SUMMARY OF THE INVENTION

The object of the present invention is to at least in part overcome the disadvantages of the prior art and in particular to provide a possibility, using means that can be implemented in a constructively simple manner, for also reliably detecting on a long-term basis that a rotary antenna of a household microwave appliance is at an unintentional standstill.

This object is achieved in accordance with the features of the independent claims. Advantageous embodiments are the subject matter of the dependent claims, the description and the drawings.

The object is achieved by a method for detecting that a rotatable microwave distribution apparatus of a household microwave appliance is at a standstill, and in said method while microwaves are being supplied into a cooking compartment of the household microwave appliance, at least one microwave leakage radiation is monitored for angle-dependent recurring fluctuations and if an absence of such fluctuations is detected, at least one action is triggered.

This method has the advantage that it is particularly cost effective and constructively simple to implement with comparatively few components. The method can also be implemented in a long-lasting manner with little probability of failure since the components that are required are not movable.

Moreover, it is possible to determine in a particularly reliable manner that the rotary antenna is at a standstill because only the desired target state (namely a changing mode image) is measured for the determination that said rotary antenna is at a standstill and the functional capability of upstream assemblies (for example an antenna rotation) that trigger the target state is not monitored.

It is also possible by the detection that the rotary antenna is at a standstill to also achieve an improved protection with respect to damage to components in the cooking compartment, for example with respect to a local overheating of an antenna cover and/or of components that absorb microwave energy such as lamps, door glasses, silicone seals, etc.

The household microwave appliance can be a dedicated microwave appliance or a microwave combination appliance. The microwave combination appliance can be an oven, in particular baking oven, with additional microwave functionality or a microwave appliance with additional IR radiating heating bodies. The household microwave appliance can also be considered a cooking appliance, in particular for treating food, which is located in the cooking compartment, by influence using microwaves.

The at least one microwave distribution apparatus can have or be at least one rotatable antenna ("rotary antenna") and microwaves that are generated by a microwave generator are supplied into the cooking compartment via said rotatable antenna. Alternatively or in addition thereto, the at least one microwave distribution apparatus can have or be at least one wobbler or stirrer.

The method of detecting that the rotatable microwave distribution apparatus is at a standstill while microwaves are being supplied comprises in particular the fact that the microwave distribution apparatus is monitored for whether it is at a standstill during a microwave operation in which the microwave distribution apparatus should be rotating. In other words, the method comprises detecting that the microwave distribution apparatus is at a standstill during the supply of microwaves during an activated or connected rotation of the microwave distribution apparatus.

The at least one microwave leakage radiation can comprise a measurement or detection of microwave leakage radiation at one or multiple leakage sites by means of one or multiple leakage radiation measurement apparatuses. The microwave leakage radiation is in particular microwave radiation that escapes from the cooking compartment through openings when the cooking compartment door is closed, for example through holes or gaps in a wall or muffle of the cooking compartment, through gaps between the wall and cooking compartment door, etc. A leakage radiation measuring apparatus is located in particular outside or on the outer side of the cooking compartment, in particular behind or in the vicinity of one or multiple openings and is configured so as to detect an intensity of the microwave leakage radiation, in particular its energy, power etc. The measurement signal that is generated is representative of the intensity of the measured microwave leakage radiation.

The angle-dependent recurring fluctuations of the microwave leakage radiation occur typically only in the case of normal rotational operation of the microwave distribution apparatus (in other words without said microwave distribution apparatus erroneously being at a standstill) since it is assumed that the field distribution of the microwaves in the cooking compartment and therefore also the microwave leakage radiation depends heavily on a rotational position of the microwave distribution apparatus while said field distribution remains at least approximately identical without rotation of the microwave distribution apparatus. If the microwave distribution apparatus is therefore regularly set to an identical sequence of rotational positions during the microwave operation, this should again find a corresponding angle-dependent recurring fluctuation of the microwave leakage radiation. If these fluctuations are absent during a microwave operation with an activated microwave distribution apparatus, this can be considered as the consequence of the microwave distribution apparatus being at a standstill.

In particular, it is possible to identify the fluctuations that are to be monitored, in particular patterns (cf. further below), automatically from the microwave leakage radiation of one or averaged multiple initial rotational angle sequences (in particular full rotations) of the microwave distribution apparatus. This provides the advantage that characteristic fluctuations can be rapidly and reliably identified and can be used to check that the microwave distribution apparatus is at a standstill.

The at least one action that can be triggered can comprise for example outputting a message to a user and/or a customer service notification.

One development is that the microwave distribution apparatus is set to a predetermined chronological sequence of discrete rotational angles. This can be advantageous for omitting rotational angles that are less suited to the treatment of food.

In one embodiment, the microwave distribution apparatus is uniformly rotated in a circumferential manner (for example continuously or in steps) and the microwave leakage radiation is monitored for periodically recurring fluctuations. The advantage is therefore achieved that a particularly detailed and easily evaluable curve of measurement values of the microwave leakage radiation can be obtained over the rotational angle. For example, a measurement value can be received or can be provided for evaluation every 0.5°, 1°, 2°, 5° etc.

In one development, the microwave distribution apparatus is rotated at a constant rotational speed. In one development, a rotational angle of the microwave distribution apparatus is changed in steps, for example in steps of 0.5°, 1°, 2°, 5° etc. In one development, between phases of the microwave operation in which the microwave distribution apparatus rotates, phases occur in which the microwave distribution apparatus is at a standstill. In the phases with the microwave distribution apparatus at a standstill, the microwave leakage radiation does not need to be monitored for fluctuations.

In one embodiment, a periodically recurring sequence of at least one pattern is monitored in a curve of the microwave leakage radiation or the corresponding curve of the measurement signal of a leakage radiation measuring apparatus that detects the microwave leakage radiation. The recurring detection of this pattern in the rhythm of the rotation of the microwave distribution apparatus renders it possible to particularly reliably detect that said microwave distribution apparatus is at a standstill on account of a malfunction. The pattern can comprise one or multiple characteristic curve properties that can be easily detected such as one or multiple extreme positions (maxima and/or minima), (rising or falling) flanks, plateaus etc. If this pattern is not repeated during multiple rotations of the microwave distribution apparatus at the same angle or angular range, it is possible to assume that the microwave distribution apparatus is at a standstill on account of a malfunction. In this case, when consecutive rotations occur it is possible for the curve to differ slightly, in particular in relation to the intensity, wherein however the curve properties such as a presence of one or multiple extreme positions etc. should be qualitatively maintained.

In one embodiment, the microwave leakage radiation is monitored for a periodically recurring sequence of at least one minimum and at least one maximum, wherein in one development consecutive minima and maxima (in an essentially arbitrary sequence) must also have a predetermined minimum value gap (also referred to as "min/max delta") with respect to one another. This advantageously provides an easily evaluable criterion for determining that the microwave distribution apparatus is at a standstill or, in a similar manner, for determining a presence of a rotation. As far as the amount is concerned, the value gap or difference should therefore not be below a predetermined threshold value according to amount so as to establish that the microwave distribution apparatus is not at a standstill. The predetermined minimum value gap can be for example 20% of an average value of the relevant minimum and maximum.

However, the microwave leakage radiation can also be monitored for the periodically recurring sequence of other curve properties, where applicable including quantitative boundary conditions or the absence of said boundary conditions, for example for the rising of a flank, a length of a plateau etc.

In one embodiment, a cross correlation of a section of the curve of the microwave leakage radiation or of the corresponding measurement signal, said section being stored in a data storage device, is continuously compared to a section of the curve that is currently received. This provides the advantage that a determination of a predetermined pattern in a curve progression can be omitted. If the measure of correlation for the corresponding angular range is below a predetermined correlation value, it is possible to conclude that the microwave distribution apparatus is at a standstill. The section that is stored in the data storage device can be automatically defined for example from one or multiple initial rotational angle sequences (in particular full rotations) of the microwave distribution apparatus. This definition can comprise an accidental selection of one or multiple rotational angle sections; alternatively it is possible to select one or multiple rotational angle sections with the aid of predetermined criteria, for example with reference to a presence of a determined characteristic or progressive form of the curve.

In general, it is possible to separately or individually monitor for the presence/absence of multiple patterns of different angles or angular regions and it is then possible to determine that the microwave distribution apparatus is at a standstill if also only one pattern, multiple patterns or all the patterns are no longer recurring.

In one embodiment, the at least one microwave leakage radiation comprises multiple microwave leakage radiations that are measured at different leakage sites and said microwave leakage radiations in each case are monitored for angle-dependent recurring fluctuations. This renders it possible to particularly reliably determine that the rotatable microwave distribution apparatus is at a standstill. This embodiment is in particular advantageous in the case that one or multiple leakage sites only provide insufficiently strong signals. For this embodiment, it can be advantageous that the microwave leakage radiation of leakage sites, which provide a signal that is too low (at which for example a specific signal threshold value is not reached or exceeded during the course of a rotation), is not taken into consideration in order to evaluate that the microwave distribution apparatus is at a standstill. In general, the microwave leakage radiation that originates from different leakage sites can be monitored separately or individually for whether the microwave distribution apparatus is at a standstill and it is then determined that the microwave distribution apparatus is at a standstill if fluctuations of the microwave leakage radiation are detected as no longer recurring only at one leakage site, at multiple leakage sites or at all the leakage sites.

In one embodiment, the at least one microwave leakage radiation comprises microwave leakage radiations that occur in an overlapping manner at multiple different leakage sites and said microwave leakage radiation is monitored for angle-dependent recurring fluctuations. This provides the advantage of a particularly simple and cost-effective embodiment since a microwave sensor can measure microwave leakage radiation that occurs at multiple leakage sites. In particular, the microwave leakage radiations that occur at different leakage sites generate measurement signals in the microwave sensor and said measurement signals are overlaid to form a total measurement signal. In one development, the microwave sensor comprises an electrical line (that can also be referred to as a "snooping line") that passes multiple leakage sites. In each case, electrical currents are induced in the same electrical line on account of the microwave leakage radiations, wherein the total current that is achieved by overlapping the respectively induced electrical currents corresponds to the measurement signal of the microwave sensor.

The object is also achieved by a microwave household appliance that is configured so as to allow the method to run as described above. The microwave household appliance can be provided in a similar manner to the method and has the same advantages.

In one embodiment, the household microwave appliance has: a cooking compartment, a microwave generator for generating microwaves, a rotatable microwave distribution apparatus for varying a field distribution of microwaves that are supplied into the cooking compartment, at least one leakage radiation measuring apparatus for measuring microwave leakage radiation and a data processing apparatus that is configured so as to implement the method.

The data processing apparatus can correspond to the central control facility of the household microwave appliance. The data processing apparatus can have a data storage device for storing measurement data.

An output of the microwave generator can be connected to one or multiple microwave guides or wave guides that are configured so as to guide the microwaves that are generated by the microwave generator into the cooking compartment. In order to supply the microwaves into the cooking compartment, the microwave guide guides said microwaves in particular to one or multiple rotary antennas. The microwave generator can have an inverter. The microwave generator can be a magnetron or a semiconductor-based microwave generator. Fundamentally, the household microwave apparatus can have one or multiple rotary antennas, one or multiple wobblers and/or one or multiple microwave generators.

BRIEF DESCRIPTION OF THE DRAWINGS

The above-described properties, features and advantages of this invention and also the manner in which these are achieved, become clearer and more explicitly understandable in conjunction with the following schematic description of an exemplary embodiment that is further explained in conjunction with the drawings.

DETAILED DESCRIPTION OF EXEMPLARY EMBODIMENTS OF THE PRESENT INVENTION

Figure 1:
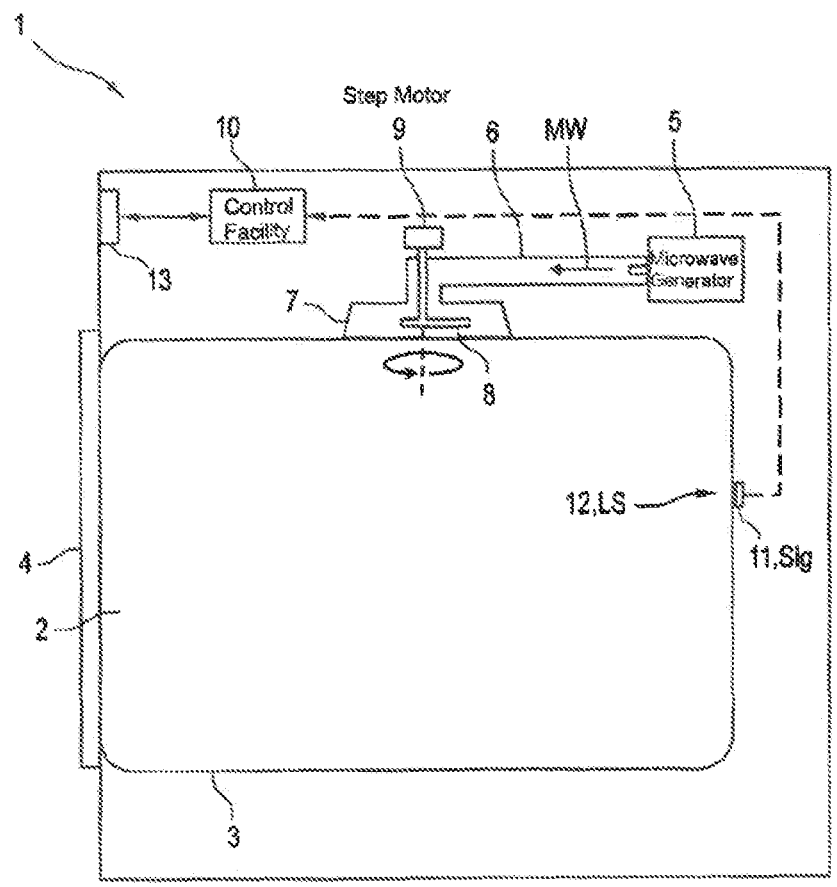
FIG. 1 shows a household microwave appliance as a sectional view in a side view.

FIG. 1 illustrates as a sectional view in a side view a sketch of a household microwave appliance 1 having a cooking compartment 2. The cooking compartment 2 is surrounded by a cooking compartment wall 3 that has a front-side loading hatch that can be closed with a door 4. The household microwave appliance 1 has at least one microwave generator 5 for the treatment of food (not illustrated) that is located in the cooking compartment 2, where applicable also further heating elements such as one or multiple resistance heating elements (not illustrated). The household microwave appliance 1 can then be in particular a baking oven having a microwave functionality.

The microwave generator 5 is connected to a microwave guide 6 that issues on the other side into a dome 7 that is arranged on the lid side. Microwaves MW that are generated by the microwave generator 5 are guided by means of the microwave guide 6 into the dome 7 from where said microwaves pass into the cooking compartment 2. A microwave distribution apparatus in the form of a rotatable rotary antenna 8 is located for this purpose in the dome 7 and the microwaves MW that arrive from the microwave guide 6 are radiated by means of said rotatable rotary antenna. The rotary antenna 8 can rotate by means of a motor, in particular a stepper motor 9, as an antenna motor, for example almost continuously in steps of 1°.

The step motor 9 can be controlled by means of a control facility 10 that is moreover connected to a leakage radiation measuring apparatus in the form of a microwave sensor 11 and is configured so as to evaluate measuring data Sig that is generated by the microwave sensor 11. The microwave sensor 11 is arranged outside or behind the cooking compartment wall 3 and namely behind or in the vicinity of an opening 12 of the cooking compartment wall 3 and said opening allows microwave leakage radiation LS to pass through. The intensity of the microwave leakage radiation LS typically changes during the course of a rotation of the rotary antenna 8 together with the field distribution of the microwaves MW in the cooking compartment 2.

Moreover, an operating facility 13 is provided that is coupled to the control facility 10 and said operating facility can have one or multiple operating elements and one or multiple display facilities, for example in the form of a touch-sensitive screen. The control facility 10 is configured so as to output one or multiple instructions or messages to a user on a display facility of the operating facility 13.

The control facility 10 is also configured so as to detect that the activated rotary antenna 8 is at a standstill and thereupon to trigger at least one action. The control facility 10 is consequently also used for this purpose as a data processing apparatus or evaluating circuit. In particular, the control facility 10 is configured so as to monitor the microwave leakage radiation LS that is measured by means of the microwave sensor 11 for angle-dependent recurring fluctuations in the rotational operation of the rotary antenna 8 while microwaves are being supplied into the cooking compartment 2 and if said control facility detects an absence of such fluctuations, said control facility is configured so as to trigger at least one action, for example to output a corresponding message to the operating facility 13 and/or to transmit said corresponding message to a mobile user end device, etc.

Figure 2:
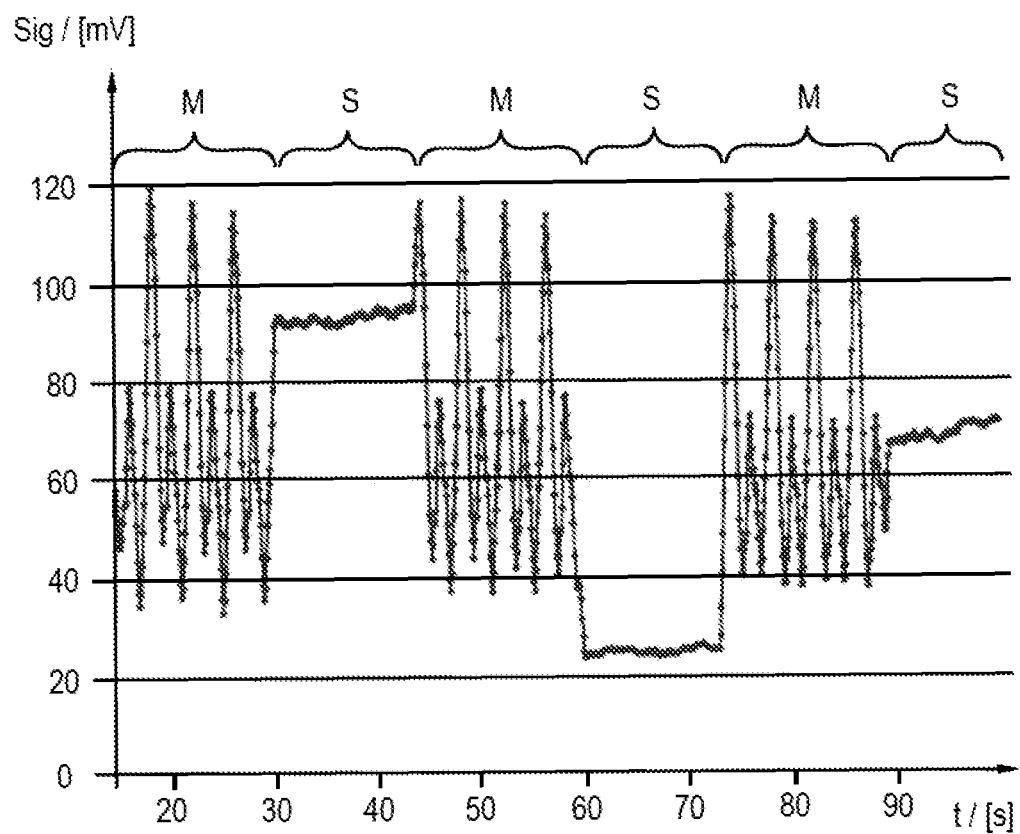
FIG. 2 shows a curve of an intensity of a microwave leakage radiation when the rotary antenna is rotating as well as when the rotary antenna is at a standstill.

FIG. 2 illustrates a curve of an intensity of a microwave leakage radiation LS that is measured by means of the microwave sensor 11 when the rotary antenna 8 is rotating as well as when the rotary antenna is at a standstill wherein measurement values Sig of the microwave sensor 11 in mV are plotted against a time t in s.

The measuring curve illustrates after the start of a microwave operation alternating time periods M in which the rotary antenna 8 rotates uniformly and time periods S in which the rotary antenna 8 does not rotate. Whereas the measurement signal Sig only changes slightly in the time periods S, intense fluctuations of the measurement signal Sig occur in the time periods M. The absence of such fluctuations consequently indicates that the rotary antenna 8 is at a standstill.

Figure 3:
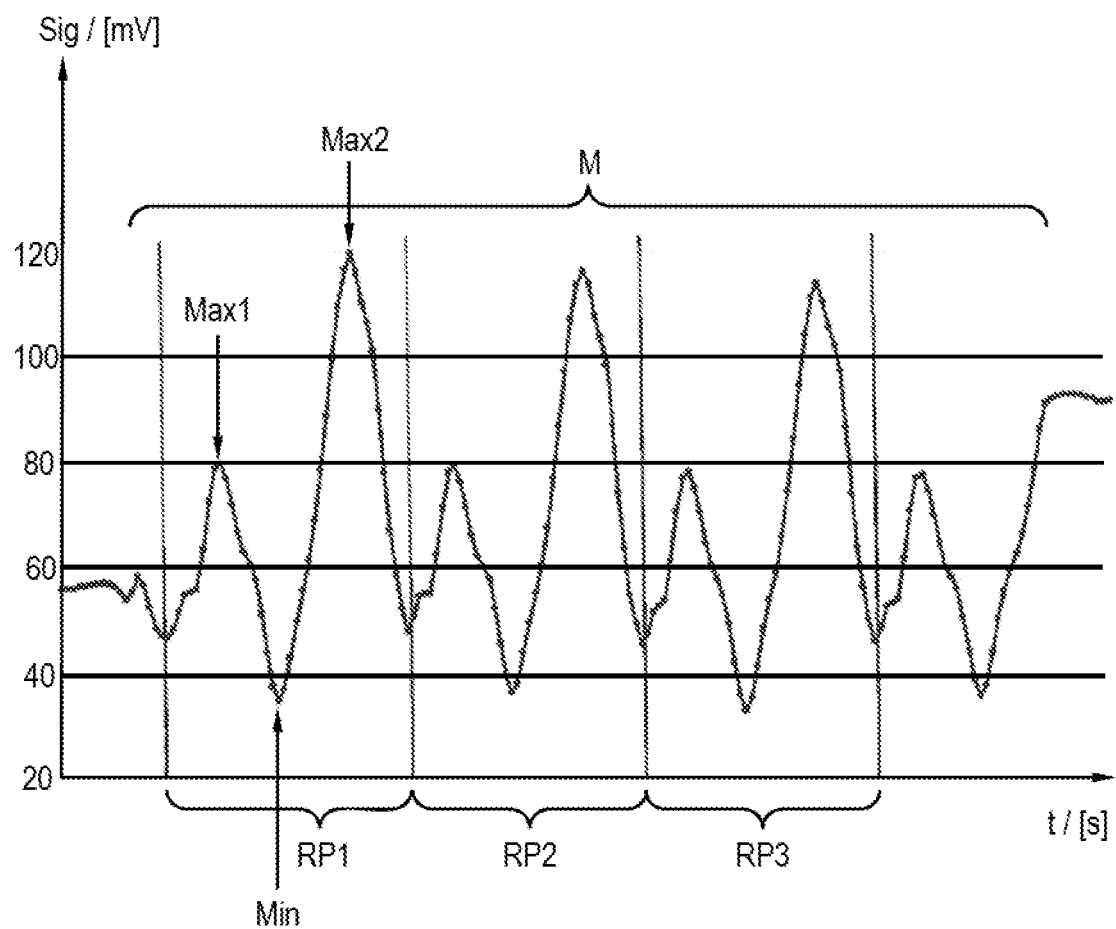
FIG. 3 shows a section from a measuring curve that is illustrated in FIG. 2 in the region of a time period with a rotating rotary antenna.

FIG. 3 illustrates a section of the measurement curve that is illustrated in FIG. 2 in the range of a time period M. The time period M comprises three consecutive full rotations RP1, RP2 and RP3. Because the rotary antenna 8 rotates uniformly during the time period M, a point in time on the x-axis for a measurement value corresponds to a respective rotational angle of the rotary antenna 8. In the illustrated exemplary embodiment, alternately a first maximum Max1, a minimum Min and a second maximum Max2 occur during a full rotation of the rotary antenna 8 in the signal curve or in the curve.

For example, it is possible by means of the control facility 10 to initially automatically identify the extreme values Max1, Min, Max2 from the curve progression during the first full rotations RP1. Then it is possible by means of the control facility 10 to monitor for whether during an activated rotation of the rotary antenna 8 these extreme values Max1, Min, Max2 occur again or periodically occur or do not occur in the following rotations RP2 and RP3. In particular, it is possible to additionally monitor for whether a minimum value gap (Min/Max-delta) between Max1 and Min and/or a minimum value gap between Min and Max2 is above an in particular respective threshold value or not. This threshold value can be for example 20% of an average value of the relevant minimum Min and maximum Max1, Max2.

It is therefore possible by means of the control facility 10 for the rotation RP1 to be monitored for whether the following applies.

$$Sig(Max1)-Sig(Min)\square \geq 0.2 \cdot [Sig(Max1)+Sig(Min)]/2$$

and/or $$Sig(Max2)-Sig(Min)\square \geq 0.2 \cdot [Sig(Max2)+Sig(Min)]/2$$

This is provided during the time period M since as an estimate the following applies, $$80-35=45 \leq 0.2 \cdot 57.5 = 11.5$$

or $$120-35=85 \leq 0.2 \cdot 77.5 = 15.5$$

while these boundary conditions are not met in the time periods S. In a similar manner, it is also possible to monitor a value gap between Max1 and Max2.

If it is identified by means of the control facility 10 that during the following rotations RP2, RP3 the extreme values Max1, Min, Max2 do not occur again or one of both of the above gap conditions is not met, said control facility triggers at least one action.

Obviously, the present invention is not limited to the illustrated exemplary embodiment.

In general, it is possible for "a", "an" or one to be understood as singular or a plurality, in particular in the sense of "at least one" or "one or multiple" etc. so long as this is not explicitly ruled out, for example by the expression "precisely one" etc.

It is also possible for the disclosure of a number to include precisely the disclosed number as well as a customary tolerance range so long as this is not explicitly ruled out.

The invention claimed is:

1. A method for detecting a standstill of a rotatable microwave distribution apparatus of a household microwave appliance, said method comprising:
   while microwaves are being supplied into a cooking compartment of the household microwave appliance, monitoring a microwave leakage radiation for angle-dependent recurring fluctuations; and
   triggering an action in the absence of such fluctuations being detected.

2. The method of claim 1, further comprising rotating the microwave distribution apparatus uniformly in a circumferential manner, wherein the microwave leakage radiation is monitored for periodically recurring fluctuations.

3. The method of claim 1, wherein the microwave leakage radiation is monitored by monitoring a periodically recurring sequence of a pattern in a curve of the microwave leakage radiation.

4. The method of claim 3, wherein the microwave leakage radiation is monitored for a periodically recurring sequence of at least one minimum and at least one maximum that have a predetermined minimum value gap with respect to one another.

5. The method of claim 3, further comprising continuously comparing a cross correlation of a stored section of the curve of the microwave leakage radiation to a section of the curve that is currently received.

6. The method of claim 3, further comprising providing the rotatable microwave distribution apparatus with at least one of a rotary antenna and a wobbler.

7. The method of claim 1, wherein the microwave leakage radiation comprises multiple microwave leakage radiations that are measured at different leakage sites, with each said microwave leakage radiation being monitored for angle-dependent recurring fluctuations.

8. The method of claim 1, wherein the microwave leakage radiation comprises microwave leakage radiations that occur in an overlapping manner at multiple different leakage sites, with the microwave leakage radiation being monitored for angle-dependent recurring fluctuations.

9. The method of claim 1, wherein the monitoring a microwave leakage radiation comprises directly monitoring radiation.

10. A household microwave appliance, comprising:
    a cooking compartment;
    a microwave generator generating microwaves for supply into the cooking compartment;
    a rotatable microwave distribution apparatus configured to vary a field distribution of microwaves that are supplied into the cooking compartment;
    a leakage radiation measuring apparatus configured to measure a microwave leakage radiation; and
    a data processing apparatus connected to the leakage radiation measuring apparatus, said data processing apparatus configured to monitor a microwave leakage radiation for angle-dependent recurring fluctuations while microwaves are being supplied into the cooking compartment and to trigger an action in the absence of such fluctuations being detected.

11. The household microwave appliance of claim 10, wherein the household microwave appliance is a baking oven having a microwave functionality.

12. The household microwave appliance of claim 10, wherein the leakage radiation measuring apparatus is configured to directly measure radiation.

13. The household microwave appliance of claim 10, wherein the microwave distribution apparatus is configured to rotate uniformly in a circumferential manner, and the leakage radiation measuring apparatus monitors the microwave leakage radiation for periodically recurring fluctuations.

14. The household microwave appliance of claim 10, wherein the leakage radiation measuring apparatus monitors the microwave leakage radiation by monitoring a periodically recurring sequence of a pattern in a curve of the microwave leakage radiation.

15. The household microwave appliance of claim 14, wherein the leakage radiation measuring apparatus monitors the microwave leakage radiation for a periodically recurring sequence of at least one minimum and at least one maximum that have a predetermined minimum value gap with respect to one another.

16. The household microwave appliance of claim 14, further comprising continuously comparing a cross correlation of a stored section of the curve of the microwave leakage radiation to a section of the curve that is currently received.

17. The household microwave appliance of claim 10, wherein the microwave leakage radiation comprises multiple microwave leakage radiations that are measured at different leakage sites, with each said microwave leakage radiation being monitored for angle-dependent recurring fluctuations.

18. The household microwave appliance of claim 10, wherein the microwave leakage radiation comprises microwave leakage radiations that occur in an overlapping manner at multiple different leakage sites, with the microwave leakage radiation being monitored for angle-dependent recurring fluctuations.

* * * * *